(12) United States Patent
Rapalino et al.

(10) Patent No.: US 12,696,842 B2
(45) Date of Patent: Aug. 4, 2026

(54) VEGETATION MANAGEMENT MACHINE TO CLEAR THE GROUND ALONG A FENCE OR ROW

(71) Applicant: DRAGONE S.R.L., Castagnole Delle Lanze (IT)

(72) Inventors: Claudio Rapalino, Castagnole Delle Lanze (IT); Marco Ponzo, Castagnole Delle Lanze (IT); Marco Chiale, Castagnole Delle Lanze (IT); Simone Barbero, Castagnole Delle Lanze (IT)

(73) Assignee: DRAGONE S.R.L. (IT)

( * ) Notice: Subject to any disclaimer, the term of this patent is extended or adjusted under 35 U.S.C. 154(b) by 636 days.

(21) Appl. No.: 18/111,272

(22) Filed: Feb. 17, 2023

(65) Prior Publication Data

US 2024/0276916 A1 Aug. 22, 2024

(51) Int. Cl.
| | |
|---|---|
| *A01D 43/16* | (2006.01) |
| *A01D 34/43* | (2006.01) |
| *A01D 34/60* | (2006.01) |
| *F15B 13/044* | (2006.01) |
| *A01D 101/00* | (2006.01) |

(52) U.S. Cl.
CPC ........... *A01D 43/16* (2013.01); *A01D 34/435* (2013.01); *A01D 34/60* (2013.01); *F15B 13/044* (2013.01); *A01D 2101/00* (2013.01); *F15B 2211/55* (2013.01)

(58) Field of Classification Search
CPC ...... A01D 43/16; A01D 69/03; A01D 34/535; A01D 34/80; A01D 34/84; A01D 34/863; A01D 34/866; A01D 34/661; A01D 34/662; A01D 34/435; A01D 34/60
See application file for complete search history.

(56) References Cited

U.S. PATENT DOCUMENTS 4,308,713 A * 1/1982 James .................... A01D 34/80
56/6

FOREIGN PATENT DOCUMENTS

| | | | | |
|---|---|---|---|---|
| DE | 29716916 U1 * | 5/1998 | | |
| DE | 10221327 A1 * | 6/2004 | ........... | A01D 34/863 |
| DE | 202010009596 U1 * | 9/2010 | ............ | A01D 34/84 |
| DE | 202021106204 U1 * | 11/2021 | ............ | A01D 34/84 |
| EP | 1477055 A1 * | 11/2004 | ........... | A01D 34/863 |
| EP | 3469865 A1 * | 4/2019 | ............ | A01D 43/08 |

* cited by examiner

*Primary Examiner* — Alicia Torres
(74) *Attorney, Agent, or Firm* — The Belles Group, P.C.

(57) ABSTRACT

A vegetation management machine for clearing the ground along a fence or a row has a connecting device, which is configured to connect a vehicle to move the machine forward along a given path and which has a coupling to mechanically connect the connecting device to the vehicle; a support structure selectively connectable to a mulcher; and an articulated arm extending from the support structure to support a mechanical weeding device independently of the mulcher and to allow the mechanical weeding device to be moved between a position wherein it falls within the mulcher bulk and a position wherein it protrudes from the mulcher in relation to the forward direction.

13 Claims, 6 Drawing Sheets

VEGETATION MANAGEMENT MACHINE TO CLEAR THE GROUND ALONG A FENCE OR ROW

FIELD OF THE ART

The present invention relates to a vegetation management machine for clearing the ground along a fence or a row.

BACKGROUND ART

Fences have the function of protecting properties from any damage caused by humans and animals. Fences not only keep animals inside the property and away from danger, but can also keep them away from areas that could harm them. Furthermore, fences reduce the likelihood of livestock being stolen or exposed to potentially dangerous wild animals.

Fences can even extend for several kilometres on generally fertile ground, so they are often invaded by vegetation and it is necessary to clear the ground adjacent to and underlying the fence of vegetation. Considering that the ground is not necessarily levelled but may have undulations and it may be difficult to reach areas under the fence, conventional vegetation management machines are not always fit for purpose.

Crops organised in rows show problems similar to those set forth for fences.

OBJECT OF THE INVENTION

An aim of the present invention is to realize a vegetation management machine for clearing the ground along a fence or a row that is effective and easy to use.

In accordance with the present invention, it is realised a vegetation management machine for clearing the ground along a fence in a row, the machine comprising:

a connecting device, which is configured to connect a vehicle to move the machine forward along a given path and which comprises a coupling to mechanically connect the connecting device to the vehicle; an articulated quadrilateral extending from the coupling and a jointed arm mounted on the articulated quadrilateral at the end opposite the coupling;

a mulcher fixed to the support structure and comprising a motorised rotor rotatable about a rotation axis perpendicular to the machine forward direction and comprising a plurality of mechanical weeding tools; a support frame of the rotor; a roller, which is supported by said frame in a rotatable manner parallel to said axis and which is configured to be arranged in contact with the ground; support wheels, each of which is supported by said frame and is arranged on the opposite side of said roller relative to said rotor; and a mechanical weeding device supported by the jointed arm to enable the mechanical weeding device to be moved between a position wherein it falls within said frame bulk and a position wherein it protrudes from the frame in relation to the forward direction.

Thereby, the mulcher works resting on the ground and is free to follow the shape of the ground, while the mechanical weeding device is free to move relative to the mulcher in order to dodge the fence posts when the mechanical weeding device is arranged under the fence and the mulcher is driven close to the fence posts.

According to a particular embodiment of the present invention, the machine comprising:

a connecting device, which is configured to connect a vehicle to move the machine forward along a given path and comprises a coupling to mechanically and hydraulically connect the connecting device to the vehicle; an articulated quadrilateral extending from the coupling and a jointed arm mounted on the articulated quadrilateral at the end opposite the coupling;

a mechanical disc weeding device supported by the jointed arm and comprising a first hydraulic motor; and a mulcher supported by the articulated quadrilateral and including a second hydraulic motor.

The first and second hydraulic motors allow power to be transmitted to the mechanical weeding device and to the mulcher, respectively, without imposing constraints on the relative movements between the mechanical weeding device and the mulcher.

In particular, the machine comprises a hydraulic circuit on board the machine to actuate the first and second hydraulic motors, the hydraulic circuit comprising a first delivery branch to actuate the first hydraulic motor and a second delivery branch connected to the first delivery branch by means of a flow diverter.

It is thereby possible to supply the first and second hydraulic motors by a single delivery point or connector.

In particular, the hydraulic circuit comprises a first discharge branch and a first pressure limiter arranged between the first delivery branch and the first discharge branch to discharge an exceeding flow rate from the first delivery branch; and a second discharge branch and second pressure limiter arranged between the second delivery branch and the second discharge branch to discharge an exceeding flow rate from the second delivery branch.

Thanks to this solution, the machine may operate with vehicles that provide different fixed pressurised oil flow rates. For this reason, the machine may be suitable for vehicles with fixed flow rate hydraulic pumps.

In particular, the connecting device and the hydraulic circuit allow independent movements between the mechanical weeding device and the mulcher and make the machine particularly suitable for managing vegetation close to a fence.

A particular aspect of the present invention lies in the versatile structure of the vegetation management machine.

In accordance with such aspect, a vegetation management machine is realised for clearing the ground along a fence or a row, the machine comprising a connecting device, which is configured to connect a vehicle to move the machine forward along a given path and comprises a coupling to mechanically and hydraulically connect the connecting device to the vehicle; a support structure selectively connectable to a mulcher; an articulated arm extending from the support structure to support a mechanical weeding device independently of the mulcher and to allow the mechanical weeding device to be moved between a position wherein it falls within the mulcher bulk and a position wherein it protrudes from the mulcher in relation to the forward direction.

BRIEF DESCRIPTION OF THE DRAWINGS

Further characteristics and advantages of the present invention will become clear from the following description of a non-limiting embodiment thereof, with reference to the Figures of the attached drawings, wherein.

PREFERRED EMBODIMENT OF THE INVENTION

Figure 1:
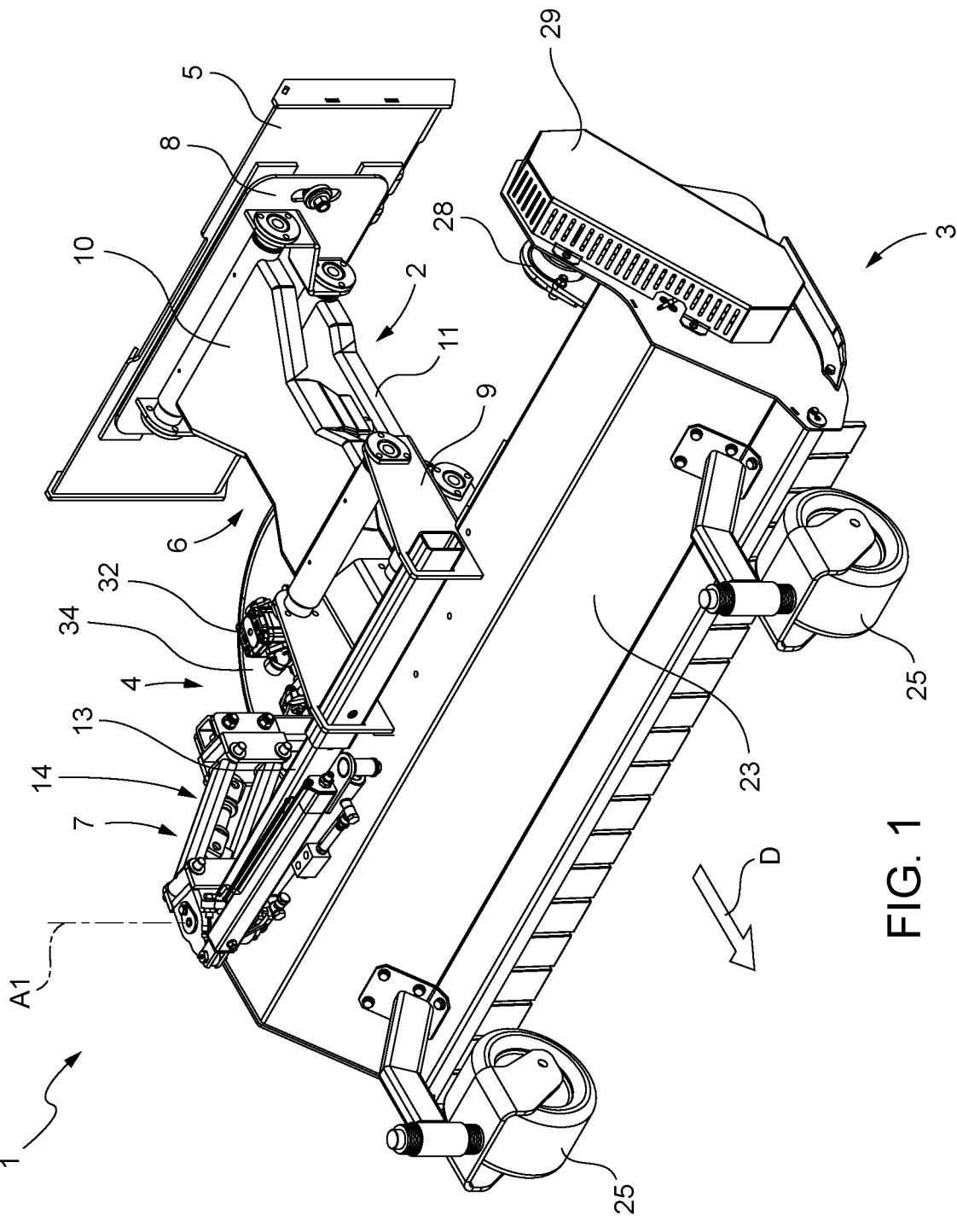
FIG. 1 is a perspective view, with parts removed for the sake of clarity, of a vegetation management machine realized according to the present invention.

In FIG. 1, reference number 1 denotes a vegetation management machine which comprises a connecting device 2 for connecting the machine to a vehicle, which is not shown in the accompanying Figures and configured to move the machine 1 forward along a given path in a forward direction D; a mulcher 3 supported by the connecting device 2; and a mechanical weeding device 4, in this specific case a mower, supported by the connecting device 2. In this specific case, the mechanical weeding device 4 is supported in an orientable way about an oscillation axis A1 to allow the mechanical weeding device 4 to be moved between a position wherein it falls within the mulcher 3 bulk and a position wherein it protrudes laterally relative to the mulcher 3 in relation to the forward direction D.

The connecting device 2 comprises a coupling 5, in this specific case shown, a skid loader, compatible with Bobcat®, Kubota® and similar tractors to implement a mechanical connection with said tractors; an articulated quadrilateral 6 to connect the coupling 5 to the mulcher 3; and an articulated arm 7 to connect the articulated quadrilateral 6, in this specific case the part of articulated quadrilateral 6 integral with the mulcher 3, to the mechanical weeding device 4.

The articulated quadrilateral 6 comprises a plate 8 mounted on the coupling 5; a support structure 9 configured to be integral with the mower 3; and two arms 10 and 11 parallel and facing each other and articulated at their opposite ends to the plate 8 and to the support structure 9 about axes that are parallel to each other. The position of the plate 8 is fixed to the coupling 5 by means of a slots-and-bolts system so as to make it possible to adjust the plate 8 in relation to the coupling 5 along the plane of the plate 8.

Figure 2:
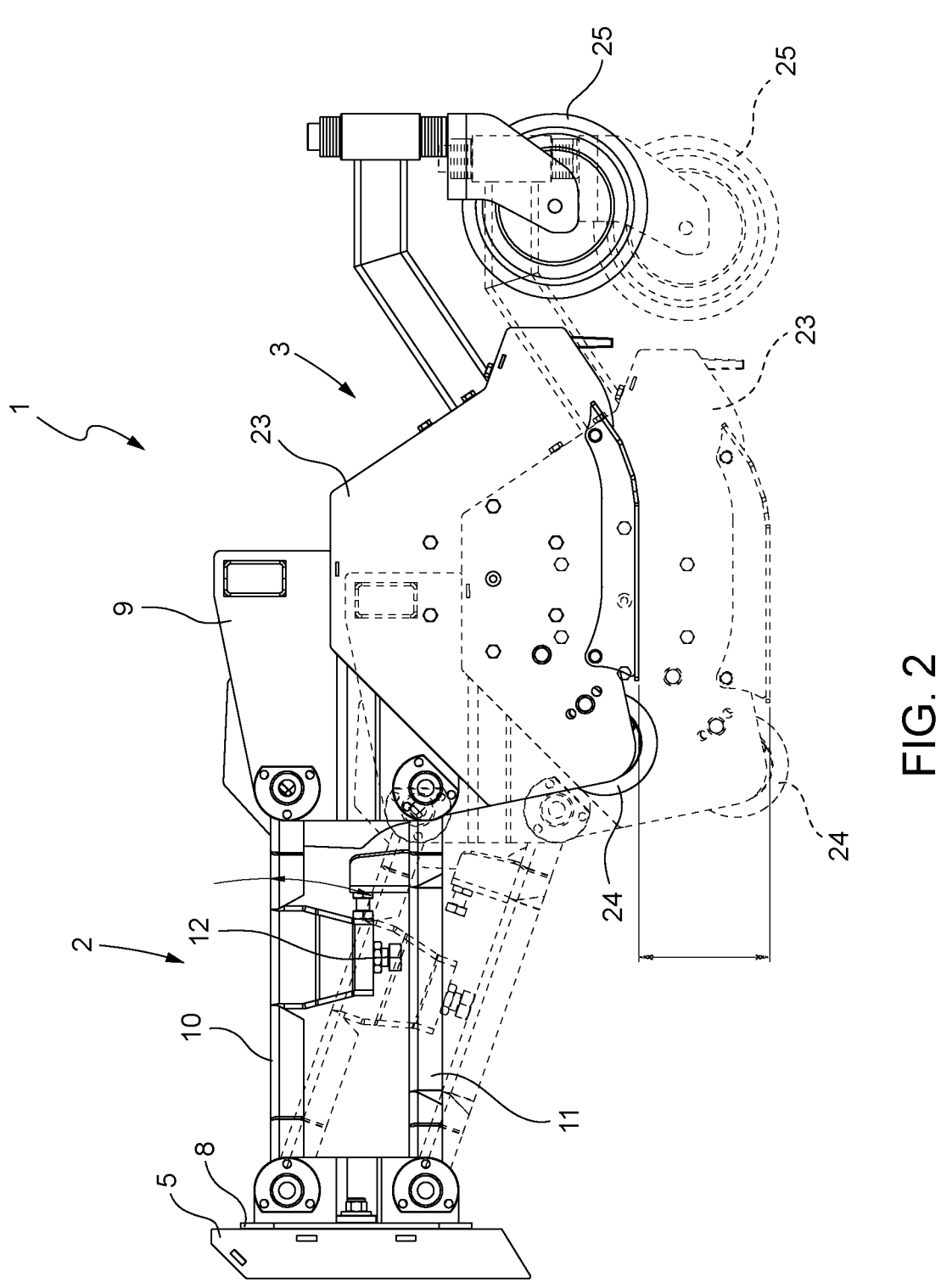
FIG. 2 is a side elevation view, with parts removed for the sake of clarity, of the machine in FIG. 1 in two operating positions.

According to what is better shown in FIG. 2, the articulation axes of the arms 10 and 11 are arranged so that the plate 8, the support structure 9 and the arms 10 and 11 form the articulated quadrilateral 6 that is freely movable between a lowered position shown in dotted lines in FIG. 2 and a plurality of raised positions one of which is shown in continuous line in FIG. 2.

In order to limit the extreme positions between the two arms 10, 11, the arm 10 comprises a stop 12, which is arranged between the arms 10 and 11 and whose extension is selectively adjustable.

Figure 3:
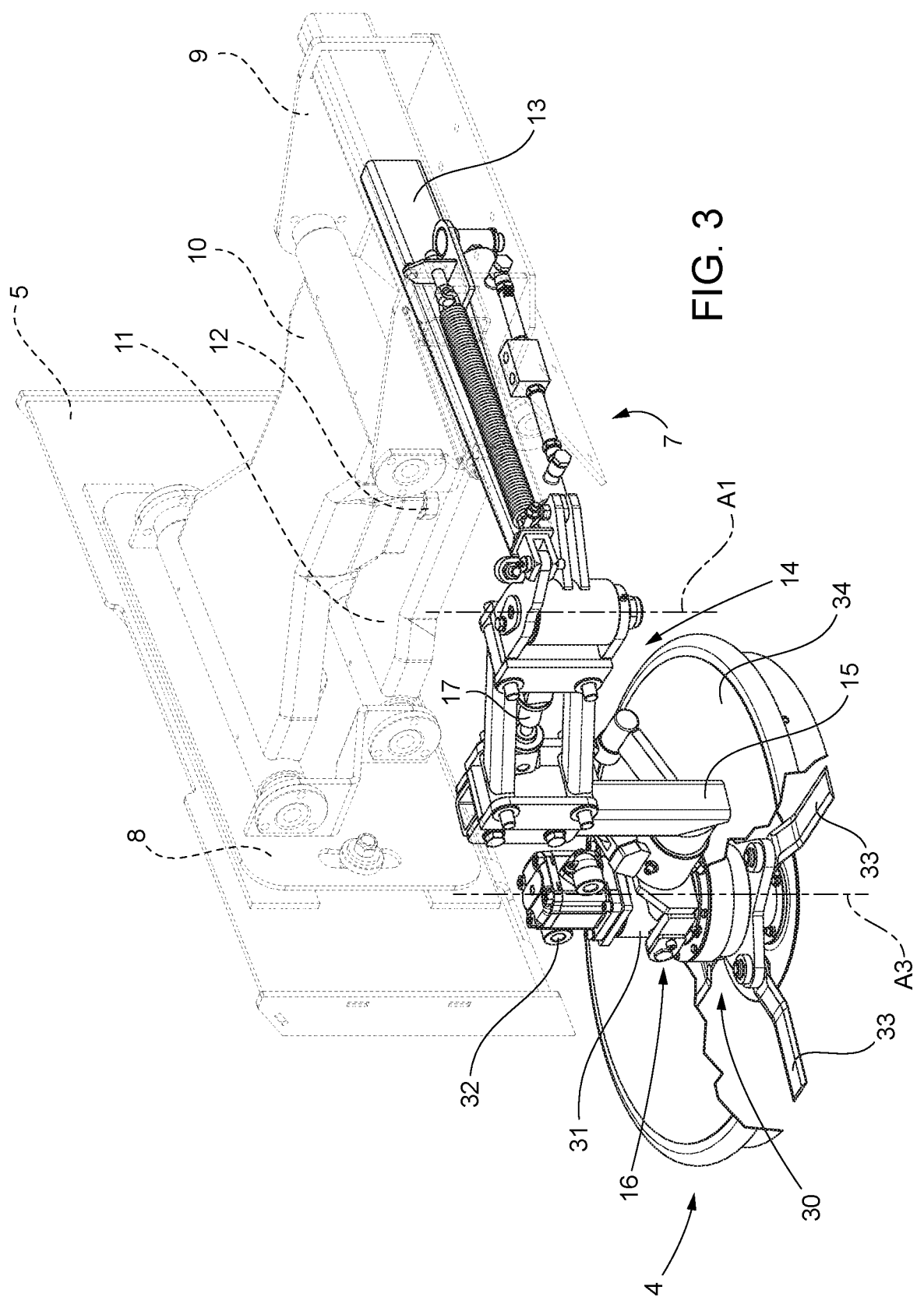
FIG. 3 shows a perspective view, on enlarged scale and with parts removed for the sake of clarity, of a detail of the machine in FIG. 1.

Referring to FIG. 3, the mulcher 3 is omitted and the articulated arm 7 comprises a rod 13 that is slidably mounted and that may be selectively adjusted and fixed in a seat of the support structure 9 with which it forms a prismatic coupling; an articulated quadrilateral 14 which is articulated at the end of the rod 13 around the axis A1; a rod 15 which connects the articulated quadrilateral 14 to the mechanical weeding device 4 by means of a fork 16 which allows free oscillations in certain intervals about mutually perpendicular axes.

The function of the articulated quadrilateral 14 is to allow a change in the height between the mechanical weeding device 4 and the support structure 9, while the function of the fork 16 is to allow the orientation of the mechanical weeding device 4 to be adapted to the inclination of the underlying ground. When the mechanical weeding device 4 is operating on a ground at a different height with respect to the mulcher 3, the mechanical weeding device 4 is lowered, under the thrust of its own weight, into the underlying depressions or is raised under the thrust of an underlying hump. In order to ease the raising of the mechanical weeding device 4, a spring 17 is arranged in the articulated quadrilateral 14 absorbing part of the weight of the mechanical weeding device 4 in order to make it easier to raise it as a result of the thrust of the ground.

Figure 4:
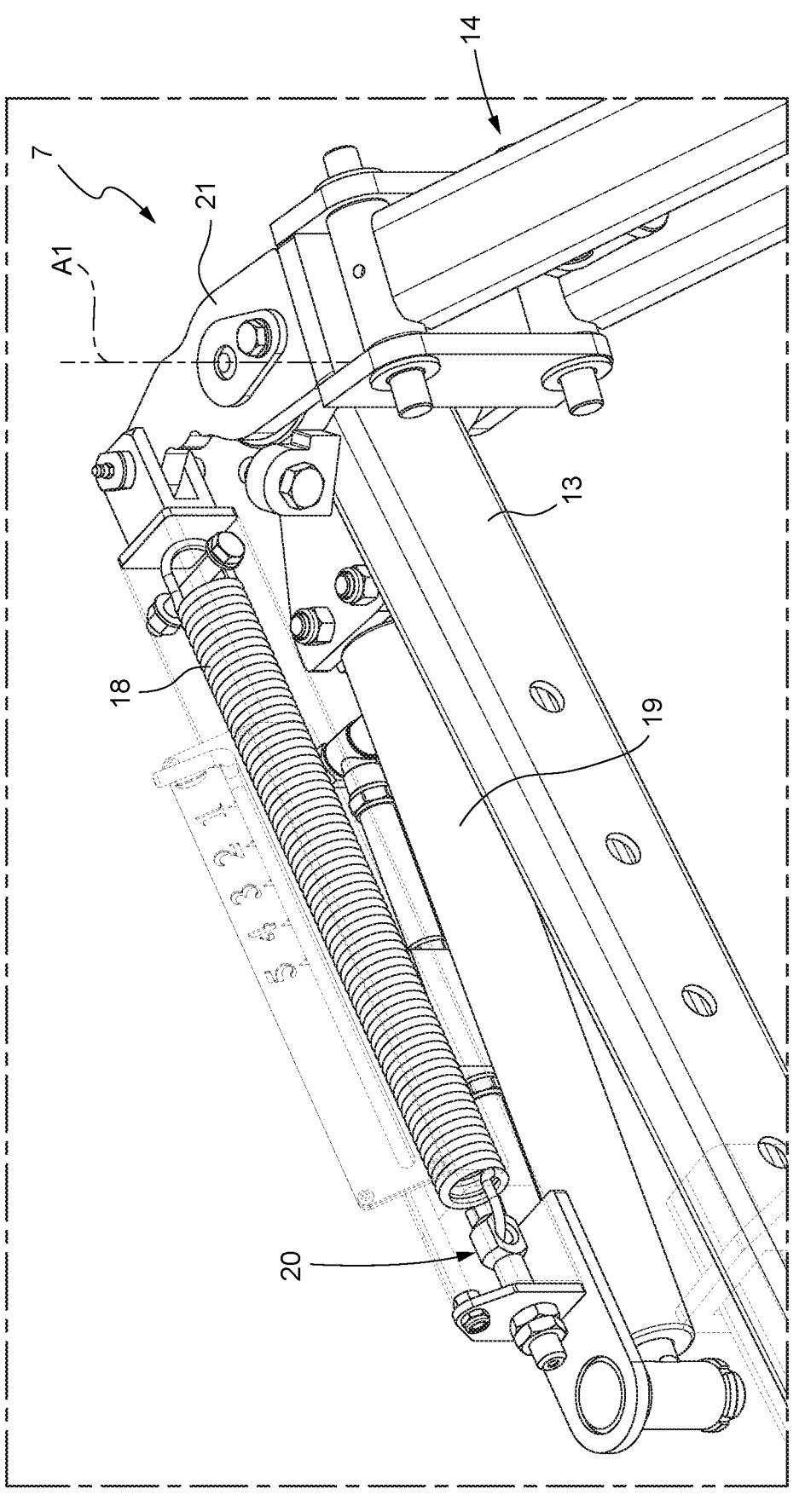
FIG. 4 is a perspective view, with parts removed for the sake of clarity and on a further enlarged scale, of a detail of the machine in FIG. 3.

Referring to FIG. 4, the articulated arm 7 comprises a spring 18 and a hydraulic cylinder 19 to control the configuration of the articulated arm 7 about the axis A1. The spring 18 extends between an anchor point 20 and a crank 21 rotatable about the axis A1 and integral with the articulated quadrilateral 14. The spring 18 works in tension and tends to arrange the mechanical weeding device 4 in the working position (not shown in the enclosed Figure), i.e. in the position according to which it exits the mulcher 3 bulk as shown in dotted lines in FIG. 5.

Figure 5:
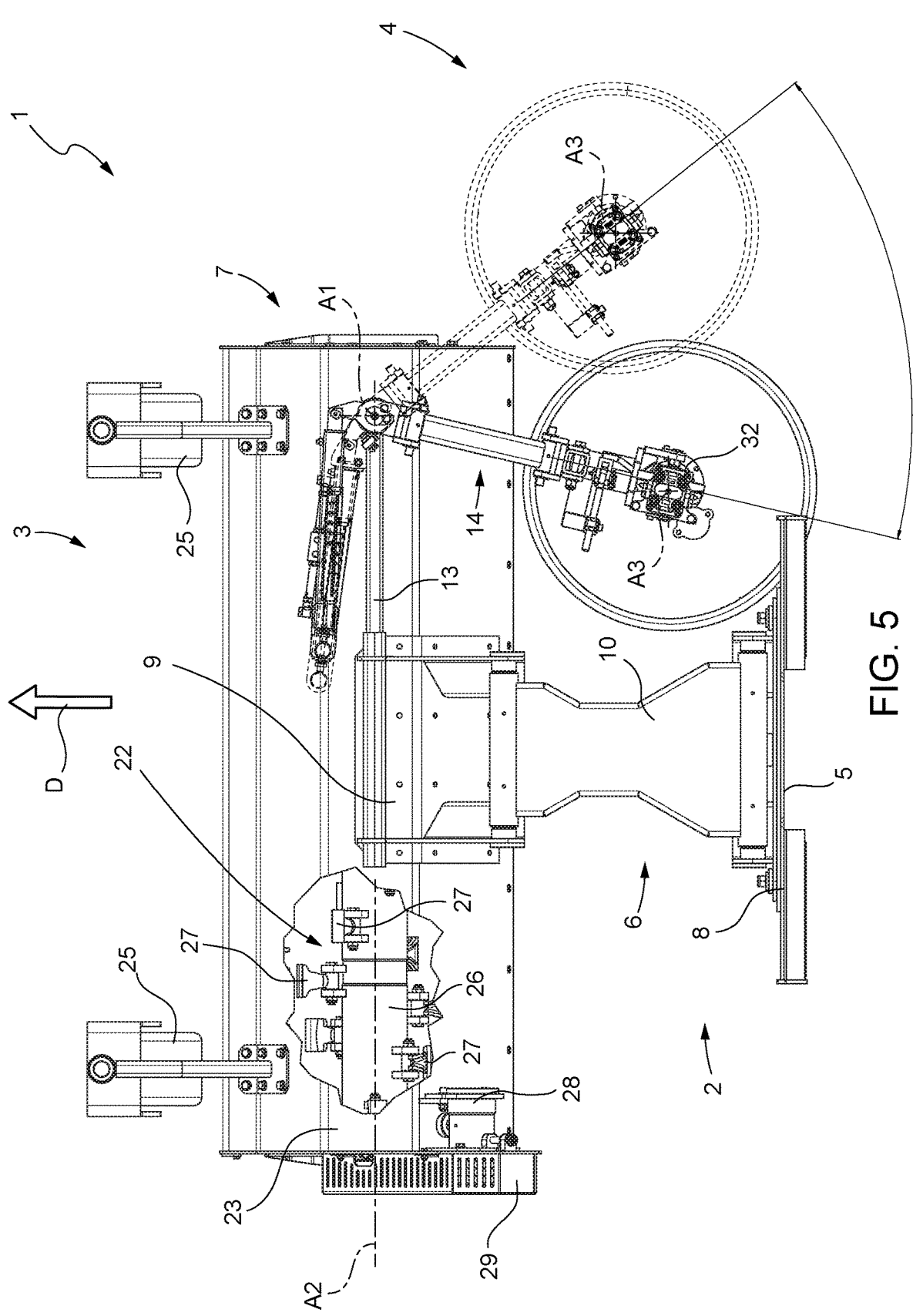
FIG. 5 is a plan view, with parts removed for the sake of clarity, of the machine in FIG. 1 in two operating positions.

Referring to FIG. 5, when the mechanical weeding device 4 is arranged in the working position (shown in dotted line in FIG. 5) it encounters an obstacle along the forward path, it is diverted towards or into the rest position (shown in continuous line in FIG. 5) by the thrust of the obstacle and, once the obstacle has been overcome, the spring 18 (FIG. 4) returns the mechanical weeding device 4 to its initial position.

With reference to FIG. 4, the hydraulic cylinder 19 is configured to vary the position of the anchor point 20 and, therefore, the pre-tensioning of the spring 18 and the resistance opposed by the spring 18 to the obstacle.

Referring to FIG. 5, the mulcher 3 comprises a motorised rotor 22 rotatable about a rotation axis A2 perpendicular to the forward direction D; a support frame 23 of the rotor 22; a roller 24 (FIG. 2), which is supported by said frame 23 in a rotatable manner parallel to said rotation axis A2 and is configured to be arranged in contact with the ground; support wheels 25, each of which is supported by the frame 23 in an orientable manner and is arranged on the opposite side of the roller 24 with respect to the rotor 22.

In this specific case, the rotor 22 comprises a drum 26 and a plurality of tools 27 hinged to the drum 26.

The rotor 22 is actuated by a hydraulic motor 28 and a mechanical transmission 29 arranged at one end of the frame 23 of the mulcher 3. In this specific case, the mechanical transmission 29 is a belt transmission interposed between the hydraulic motor 28 and the rotor 22.

Referring to FIG. 3, the mechanical weeding device 4 is a disc mower and comprises a rotor 30 rotatable about the axis A3; a frame 31; and a hydraulic motor 32 supported by the frame 31.

The rotor 30 comprises cutting tools 33, in this specific case four radial blades. The frame 31 is supported by the articulated arm 7, so it can be configured in a plurality of positions and orientations and comprises a bonnet 34, which is arranged above and around the cutting tools 33 and is configured to be arranged in contact with obstacles along the forward path.

5

Figure 6:
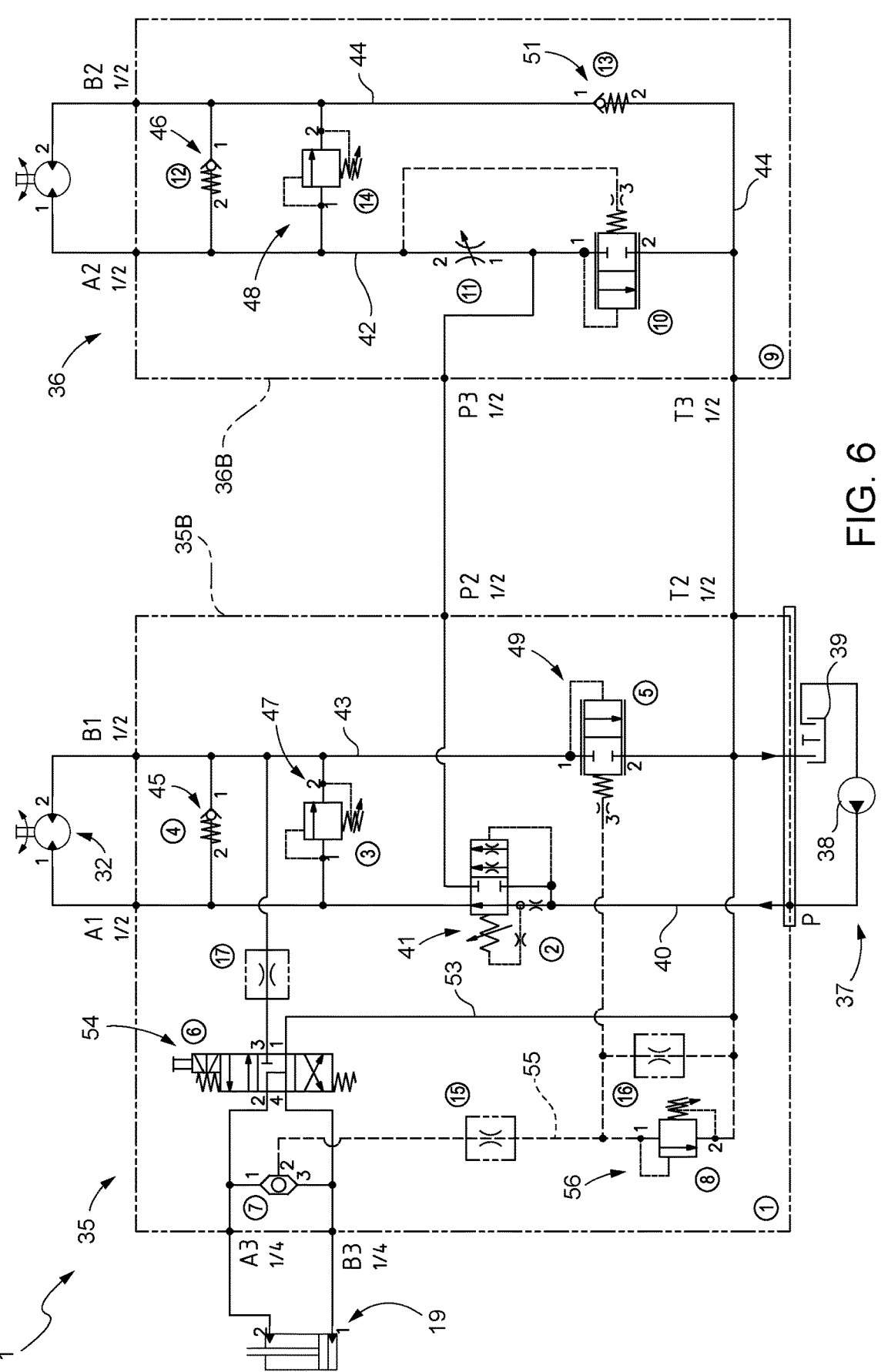
FIG. 6 is a schematic view of a hydraulic circuit of the machine in FIG. 1.

Referring to FIG. 6, the machine 1 is generally hydraulically controlled via two hydraulic circuits 35 and 36 on board the machine and one hydraulic circuit 37 on board the vehicle, which can be connected to each other.

The hydraulic circuits 35 and 36 on the machine are configured to selectively control hydraulic motors 32 and 28 respectively. The hydraulic circuit 35 also controls the hydraulic cylinder 19.

The hydraulic circuit 37 on board the vehicle comprises a hydraulic pump 38 and a tank 39.

The hydraulic circuits 35 and 36 can be substantially compacted into two respective hydraulic blocks 35B and 36B, which can operate either separately or jointly to be put in communication with each other.

The following description initially refers to the joint operation mode. The hydraulic circuit 35 comprises a delivery branch 40 to supply the hydraulic motor 32; a diverter 41 to selectively supply a delivery branch 42 of the circuit 36 to supply the hydraulic motor 28.

The hydraulic circuits 35 and 36 comprise two respective discharge branches 43 and 44 that connect the respective hydraulic motors 32 and 28 to the discharge; and two respective non-return valves 45 and 46, which allow oil to flow from the discharge branch 43 to the delivery branch 40 and from the discharge branch 44 to the delivery branch 42 directly downstream of the respective hydraulic motors 32 and 28 to prevent cavitation phenomena.

The delivery branch 40 is connected to the discharge branch 43 by a pressure limiter 47 to discharge an exceeding flow rate due to a possible pressure spike caused by a sudden shock hindering the rotation of the hydraulic motor 28.

Similarly, the delivery branch 42 is connected to the discharge branch 44 by a pressure limiter 48 to discharge an exceeding flow rate.

The hydraulic circuit 35 further comprises a piloted valve 49 along the discharge branch 43 to throttle the discharge branch when the hydraulic cylinder 19 is actuated, while the hydraulic circuit 36 comprises a flow rate limiter 50 connecting the delivery branch 42 to a section of the discharge branch 44 downstream of a non-return valve 51.

The hydraulic circuit 35 comprises a delivery branch 52 and a discharge branch 53 for respectively supplying and discharging the hydraulic cylinder 19, which is a double-acting hydraulic cylinder comprising two chambers and is controlled by a two-way, three-position solenoid valve 54 to actuate the hydraulic cylinder 19 in one direction, in the opposite direction and to discharge both chambers of the hydraulic cylinder 19.

The delivery branch 52 originates from the outlet branch 43 between the pressure limiter 47 and the pressure limiter 49, which is controlled by a control branch 55 to control the pressure limiter 49.

The hydraulic circuit 35 comprises a pressure limiter 56 along the control branch 55 to drive the piloted valve 49.

The hydraulic circuits on-board the machine 35 and 36 allow three utilities to be supplied at the respective operating pressures and flow rates even with a constant flow rate pump.

Referring to FIG. 1, the machine 1 may be arranged and provided in three configurations. The first configuration provides the presence of the connecting device 2, mulcher 3, and mechanical weeding device 4; the second configuration provides the presence of the connecting device 2 and mulcher 3 and the absence of the mechanical weeding device 4; and the third configuration provides the presence of the connecting device 2 and of the mechanical weeding device 4 and the absence of the mulcher 3 as shown in FIG. 3.

Referring to the first configuration, the machine 1 comprises both circuits 35 and 36 on board the machine.

In the second configuration, the hydraulic circuit 36 is directly connected to the hydraulic circuit 37 on board the vehicle and the hydraulic circuit 35 is omitted.

In the third configuration, the hydraulic circuit 36 is omitted and the ports 57 and 58 connecting the block 35B with the block 36B are closed or the connection is diverted.

It is clear that the present invention comprises variants of the described embodiment that are included in the scope of protection of the appended Claims.

The invention claimed is:

1. A vegetation management machine for clearing the ground along a fence, the machine comprising:
   a connecting device, which is configured to connect to a vehicle to move the machine forward along a given path, the connecting device comprising:
      a coupling to mechanically connect the connecting device to the vehicle;
      an articulated quadrilateral extending from the coupling; and
      a jointed arm mounted on the articulated quadrilateral at the end opposite the coupling;
   a mulcher fixed to a support structure and comprising a motorised rotor rotatable about a rotation axis perpendicular to the machine forward direction and comprising a plurality of mechanical weeding tools; a support frame of the rotor; a roller, which is supported by said frame in a rotatable manner parallel to said axis and which is configured to be arranged in contact with the ground; support wheels, each of which is supported by said frame and is arranged on the opposite side of said rotor relative to said roller; and
   a mechanical weeding device supported by the jointed arm to enable the mechanical weeding device to be moved between a position wherein it falls within a frame bulk and a position wherein it protrudes laterally from the frame bulk in relation to the forward direction.

2. The machine as claimed in claim 1, wherein the jointed arm comprises an additional articulated quadrilateral to allow for a change in the height of the mechanical weeding device relative to the mulcher.

3. The machine as claimed in claim 1, wherein the mechanical weeding device and the mulcher are actuated by a first and second hydraulic motor respectively.

4. The machine as claimed in claim 1, wherein the mulcher has a mechanical transmission arranged at one end thereof, said mechanical weeding device being arranged at the opposite end.

5. The machine as claimed in claim 1, wherein the mechanical weeding device is a disc mower, which comprises cutting tools rotatable about a further substantially vertical rotation axis and comprises a bonnet, which is arranged above and around the cutting tools and configured to be arranged in contact with obstacles along the machine forward path.

6. The machine as claimed in claim 1, wherein the jointed arm comprises a spring to hold the mechanical weeding device in the protruding position relative to the frame bulk.

7. The machine as claimed in claim 6, wherein the jointed arm comprises a hydraulic cylinder to adjust a tension of said spring.

8. A vegetation management machine for clearing the ground along a fence or row, the machine comprising:

a connecting device, which is configured to be connected to a vehicle in order to move the machine forward along a given path, comprising:

a coupling to mechanically connect the connecting device to the vehicle;

an articulated quadrilateral extending from the coupling, the articulated quadrilateral comprising a support structure; and an articulated arm;

a mechanical weeding device actuatable by means of a first hydraulic motor, wherein the mechanical weeding device is mounted at the articulated arm; and a mulcher actuatable by means of a second hydraulic motor, wherein the mulcher is mounted to the support structure.

9. The machine as claimed in claim 8, and comprising a first hydraulic circuit on board the machine to actuate the first hydraulic motor and a second hydraulic circuit on board the machine to actuate the second hydraulic motor.

10. The machine as claimed in claim 9, wherein the first hydraulic circuit comprises a first discharge branch and a first pressure limiter arranged between a first delivery branch and the first discharge branch to discharge an exceeding flow rate from the first delivery branch.

11. The machine as claimed in claim 10, wherein the second hydraulic circuit comprises a second discharge branch and a second pressure limiter arranged between a second delivery branch and the second discharge branch to discharge an exceeding flow rate from the second discharge branch.

12. The machine as claimed in claim 11, and comprising a double-acting hydraulic cylinder having a first and second chamber to control the articulated arm, the first hydraulic circuit comprising a third delivery branch and a third discharge branch, and a solenoid valve to selectively supply the first chamber and discharge the second chamber or supply the second chamber and discharge the first chamber or discharge the first and second chambers.

13. The machine of claim 8, wherein the articulated arm is slidably coupled to the support structure in a direction transverse to the forward direction.

* * * * *